United States Patent [19]

Carroll et al.

[11]  4,349,220
[45]  Sep. 14, 1982

[54] RAINTIGHT WIREWAY

[75] Inventors: James C. Carroll, Hamilton, Ohio; Donald L. Chapman, Liberty, Ind.

[73] Assignee: Square D Company, Palatine, Ill.

[21] Appl. No.: 182,304

[22] Filed: Aug. 28, 1980

[51] Int. Cl.³ .............................................. F16L 45/00
[52] U.S. Cl. ..................................... 285/121; 285/406; 285/417; 285/424; 138/92; 138/155; 138/160; 138/163
[58] Field of Search ................ 285/119, 424, 417, 410, 285/DIG. 2; 52/221; 174/68 C, 101; 138/92, 155, 156, 157, 158, 159, 163, 160

[56] References Cited

U.S. PATENT DOCUMENTS

| 269,086 | 12/1882 | McLaughlin | 285/137 R |
|---|---|---|---|
| 2,982,570 | 5/1961 | Lohman | 285/424 X |
| 3,023,032 | 2/1962 | Johnston et al. | 285/424 X |
| 3,351,699 | 11/1967 | Merckle | 174/68 C |
| 3,679,242 | 7/1972 | Hess | 285/417 |
| 4,040,449 | 8/1977 | Butler | 174/68 C X |
| 4,077,434 | 3/1978 | Siekert et al. | 285/DIG. 22 |

Primary Examiner—Dave W. Arola
Attorney, Agent, or Firm—Larry I. Golden; Norton Lesser; Richard T. Guttman

[57] ABSTRACT

A gangable wireway assembly including a plurality of generally U-shaped troughs and trough covers utilized as either tandem sections or as fittings which connect the tandem sections in an elbow, tee or cross configuration. Trough covers have upstanding lips at opposite ends and drip hood flanges running along longitudinal margins which overlap flanges on the U-shaped trough. The tandem section covers include a reverse bend on one drip hood flange to interlock one margin of the cover with the trough. Adjacent trough ends are nestingly received by a connector and adjacent trough covers are overlapped by a connector cover at the juncture of adjacent cover sections. The connector cover includes a recess receiving the lips of adjacent covers and includes flanges in overlapping relationship with the drip hood flanges. One flange on the connector cover also includes a reverse bend to interlock with the associated drip hood flanges. Also provided is a generally U-shaped panel adapter and cover having opposite open ends, one of which includes outwardly directed flanges for sandwiching a gasket against a cabinet wall having an opening though which wires may extend from the wireway to the cabinet. A generally U-shaped closing plate having one open end and an opposite closed end is utilized to close a trough end.

19 Claims, 12 Drawing Figures

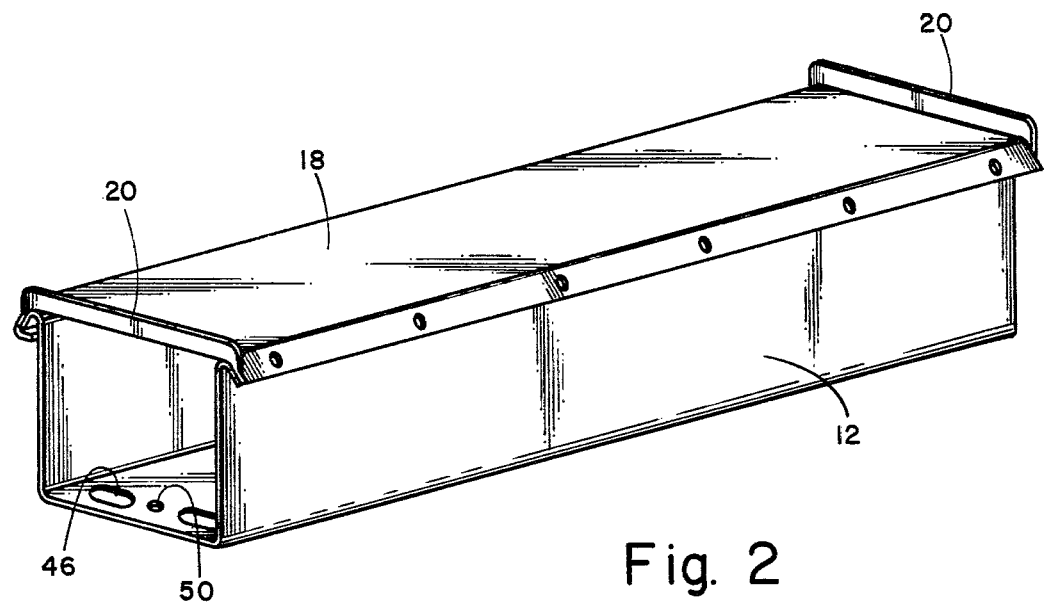
Fig. 2
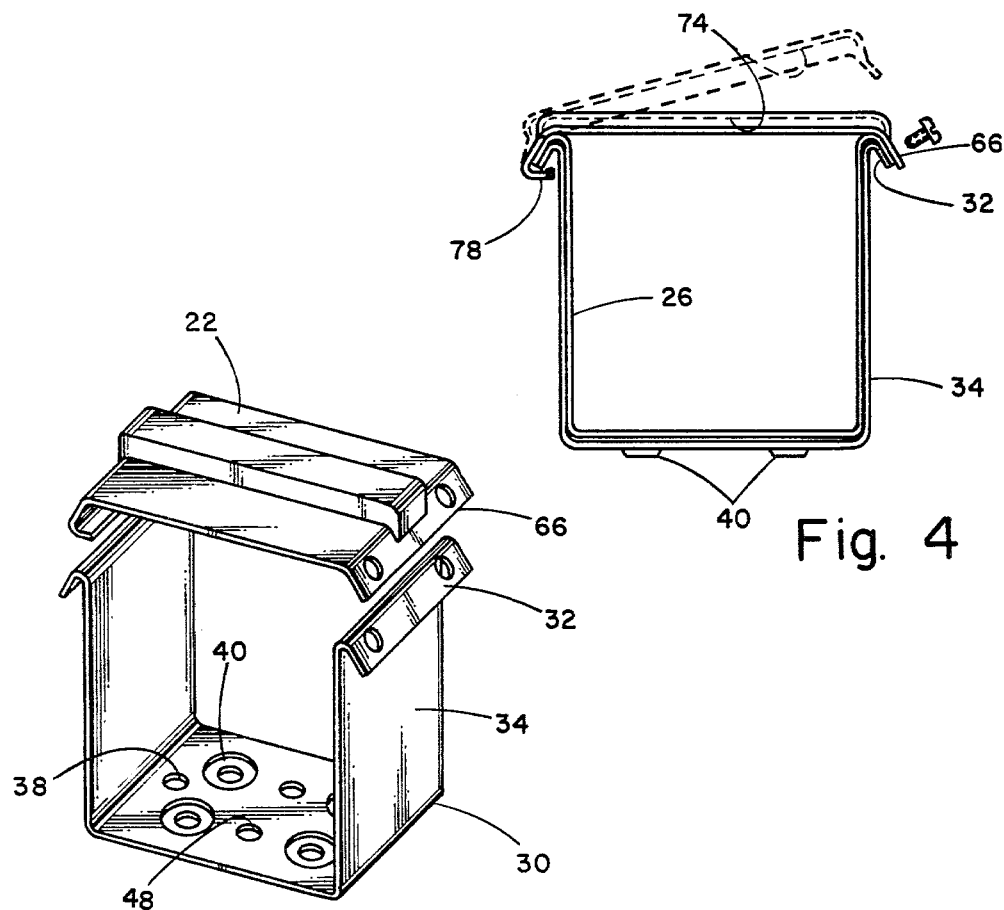
Fig. 4
Fig. 5

RAINTIGHT WIREWAY

FIELD OF THE INVENTION

The present invention relates in general to gangable raintight or moisture proof wireway and more particularly to an improved economical arrangement for preventing the entrance of water or other contaminants through the junctures of sections and covers of wireway that are coupled to each other.

SUMMARY OF THE PRIOR ART

Gangable wireway is used as a housing in which electrical wiring is layed or deposited for extending electrical connections between between various locations as from meters or cabinets. The wireway often comprises sections of tandemly arranged straight lengths and may also include elbows, tees or other types of sections. The sections are generally U-shaped toughs having covers and when used in outdoor locations it is often necessary to provide gasketing material between ends of the junctures of adjacent troughs and between the covers that overlap the trough in which the wire is laid for preventing the entrance of moisture or other contaminants into the trough. This is a relatively expensive arrangement.

SUMMARY OF THE INVENTION

The present invention proposes the use of drip hood flanges on the cover with the flanges extending below and past the edges of the trough together with an upstanding flange at respective cover ends extending past the trough edges and received in a connector recover recess to prevent the entrance of rain or other contaminants between the sections. A connector straddling the adjacent ends of several sections serves to secure two troughs or sections together with the connector cover having drip hood flanges along opposite margins overlapping the ends of adjacent trough cover drip hood flanges and preventing the entrance of water between the junctures of adjacent sections. The connector covers are fastened to reverse legs on the connector to secure the covers with reverse legs on the troughs and the drip hood flanges of the cover therebetween to the connector at a position below the top edge of the troughs to prevent the entrance of water or the like through the junctures. Thus the need for gasketing between adjacent sections is eliminated.

A reverse bend or leg on one drip hood flange of the connector covers and on one trough cover drip hood flange serves to interlock one margin of the covers with the troughs so that only the drip hood flanges along the other margin need be secured by a fastening device. This not only eliminates the need for additional fastening screws but also avoids the necessity of using a tool on such additional fastening devices in the event the wireway is mounted with one side adjacent a wall or other obstruction.

It is therefore an object of the present invention to provide improved gangable raintight wireway.

It is another object of the present invention to provide more economical gangable raintight wireway.

It is still another object to provide a move versatile wireway system.

Still a further object is the use of interchangeable parts in a wireway system.

Other objects together with features of the present invention will become apparent on examination of the following specification and claims together with the drawings.

DESCRIPTION OF THE DRAWINGS

FIG. 2 is an isometric view of a trough and cover.

FIG. 4 is an end elevational view of a trough cover and connector assembly with the connector cover also being shown in partially open position.

FIG. 5 is a isometric view of the connector assembly.

DESCRIPTION OF THE PREFERRED EMBODIMENT

Figure 1:
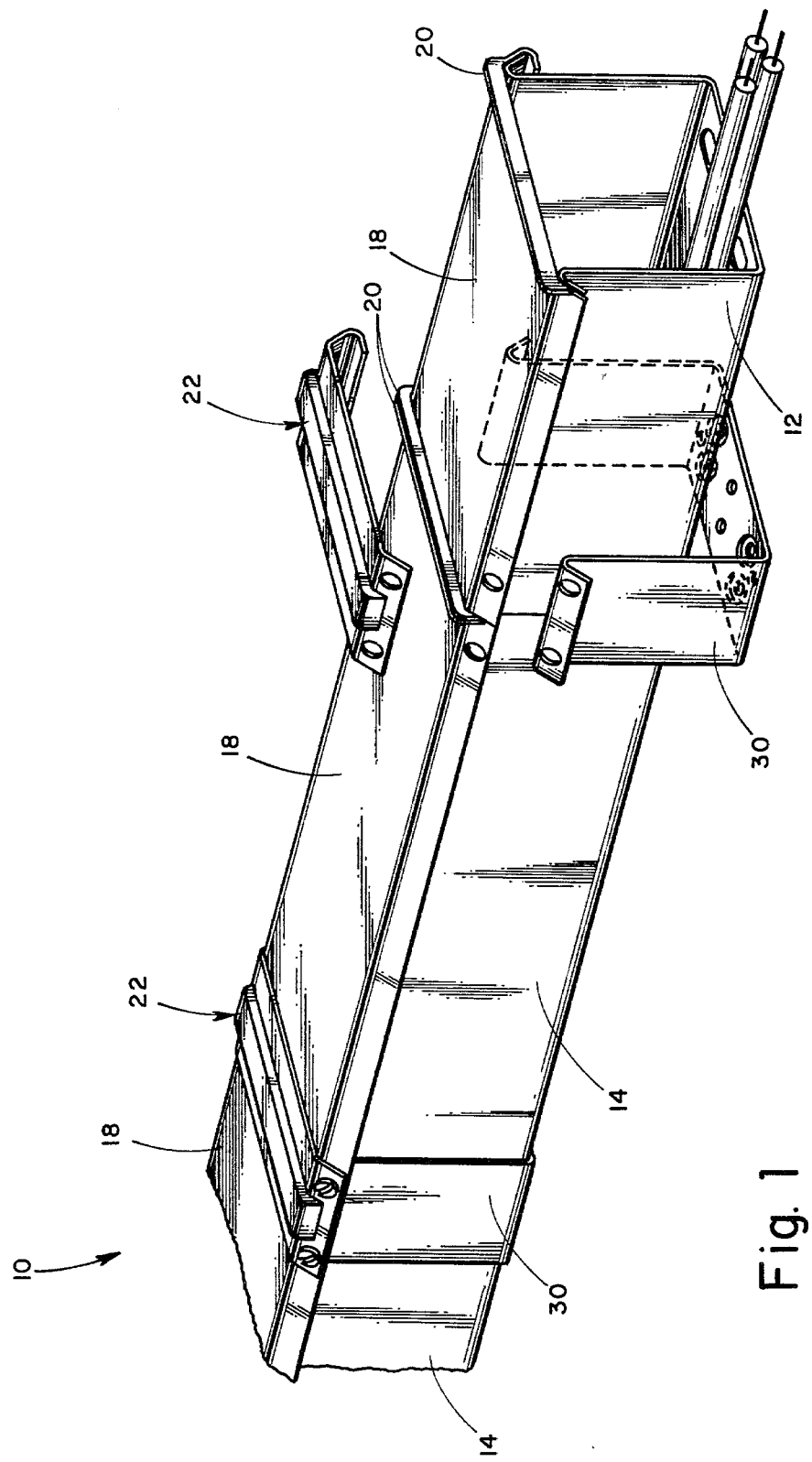
FIG. 1 is an isometric view illustrating an assembly of several sections of gangable raintight wireway employing the principles of the present invention.
Figure 1A:
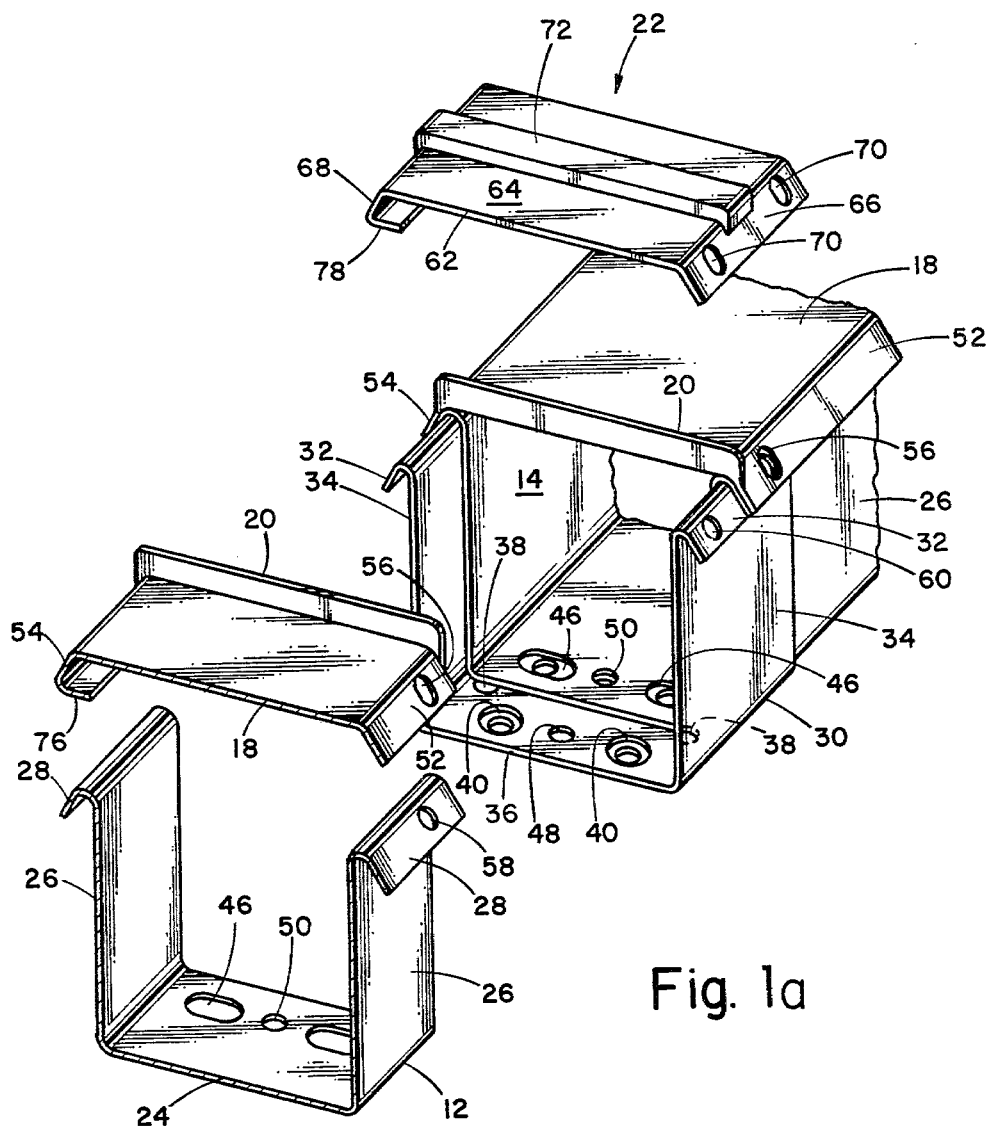
FIG. 1a is an exploded isometric view of portions of several sections of the wireway shown in FIG. 1.
Figure 3:
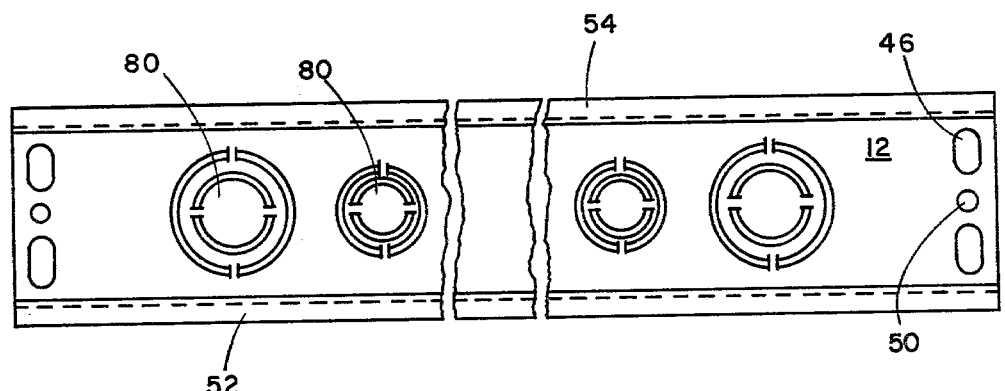
FIG. 3 is a top elevation in view of the trough shown in FIG. 2.
Figure 6:
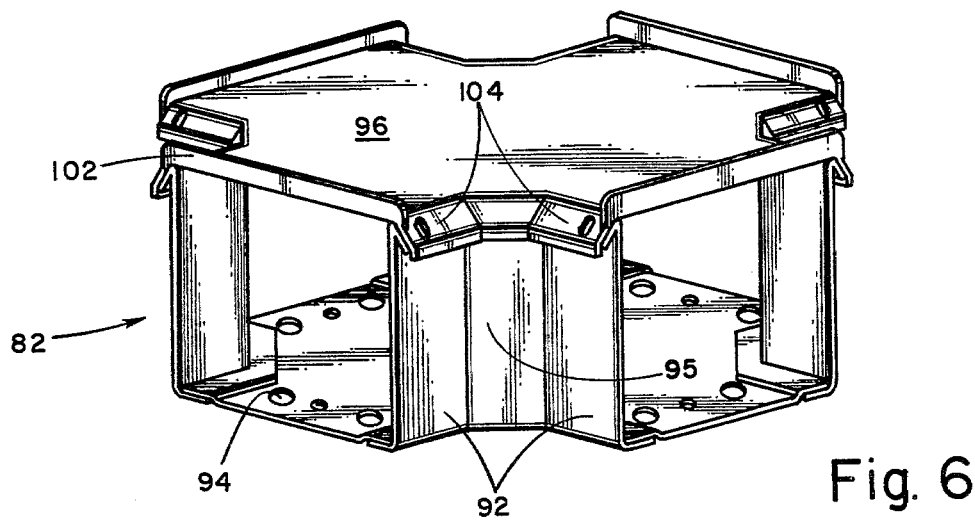
FIG. 6 is a isometric view of a junction box for use with a connector assembly and troughs.
Figure 7:
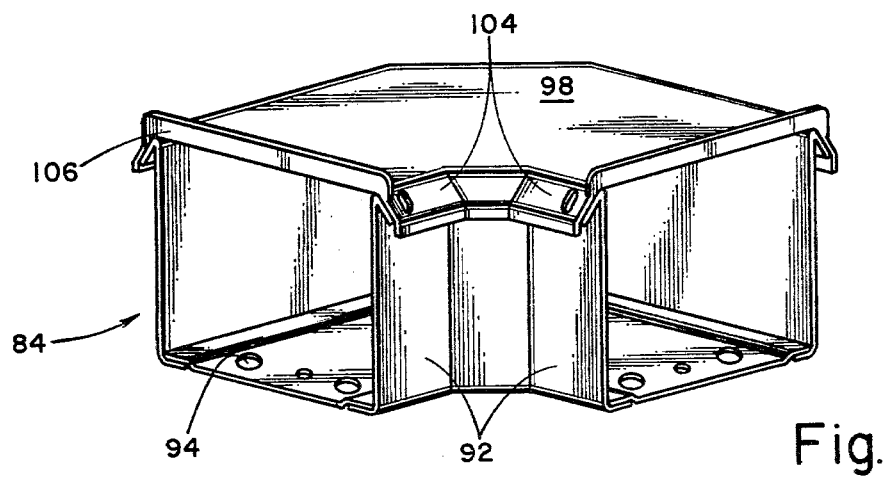
FIG. 7 is an elbow for use with the connector assembly and troughs.
Figure 8:
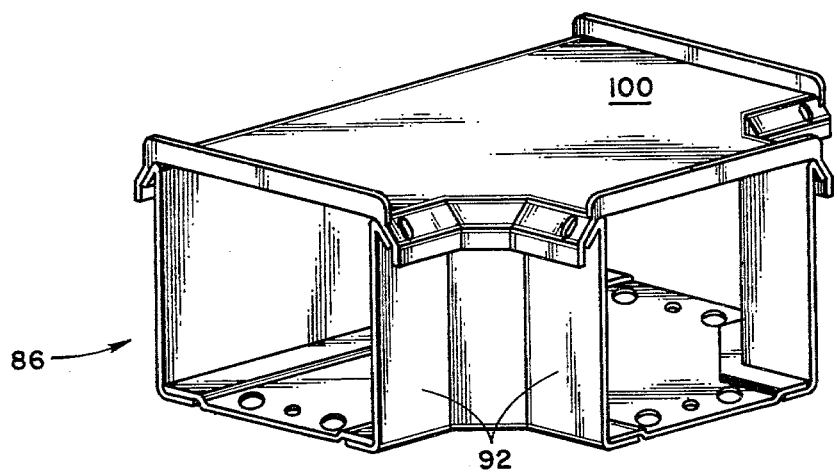
FIG. 8 is a tee shown for use use with the connector assembly and troughs.

In FIG. 1 a portion of a gangable raintight wireway assembly is indicated by the reference character 10. As shown in FIG. 1 the assembly 10 comprises a pair of adjacent or tandem U-shaped sections or troughs 12 and 14, which are assembled in end to end abutting engagement. The troughs 12 and 14 are each overlapped by a respective cover 18. Each cover has an upstanding transverse end flange 20 at opposite ends for abutting or facing engagement with a similar flange on a respective end of the cover 18 of an adjacent trough. A connector assembly 22 overlaps and secures the abutting and adjacent ends of the respective troughs 12 and 14 and covers 18 as will be explained.

It will be noted that the troughs 12 and 14 are each formed in a generally U-shaped generally 4" or 6" wide and may be any of a plurality of lengths generally varying between 1' and 10'. A bottom wall 24 and upstanding or vertical side legs 26 form the U-shaped of each trough. The side legs 26 have a free upper end each provided with a reverse bend 28. The reverse bends 28 each extend longitudinally along the axis of the trough and each slopes downwardly and outwardly from the respective top margin or edges of the respective leg 26.

The connector assembly 22 includes a U-shaped connector or strap 30 which nestingly receives the back and side walls of the adjacent troughs to sandwich and overlap the adjacent and abutting end portions of the troughs 12 and 14. Strap 30 extends longitudinally for a short distance past the respective abutting trough ends. The connector 30 is also provided with reverse bends 32 at the free ends of the side legs 34 of the connector 30 and the bends 32 are similar to reverse bends 28 on the troughs for nestingly receiving the trough bends 28 adjacent the abutting trough ends.

Figure 11:
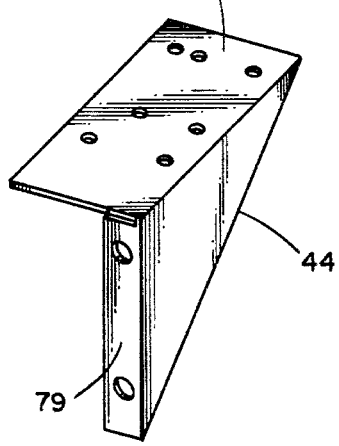
FIG. 11 illustrates a bracket for supporting the wireway from an adjacent wall.

The connector 30 includes a back wall 36 located of course just below the trough back walls. Wall 36 has drain openings 38 therein for draining any condensate from the troughs that would drip between abutting trough ends. In addition, depressed or downwardly embossed openings 40 are formed in wall 36 below each trough back wall for receiving screws to fasten the connector 30 to a suitable support such as the wall 42 of bracket 44 seen in FIG. 11 or any other suitable support. Access to the screws which are recessed in the depressions to avoid interference with the wire is provided by elongate slots 46 adjacent the end of the back wall of each trough. The slots 46 may also be used to fasten the troughs to the connector and support; however, normally, aligned openings 48 and 50 in walls 36 and 24 respectively are used to receive self tapping screws for this purpose. The depressed embossments about holes 40 also serve to space the connector and troughs from the support wall 42 to assist drainage and permit the desired screw length to project through opening 48 without engaging the support wall 42. Water collecting in the depressions above the height of wall 36 will of course run off through the holes 38.

The covers 18 which overlap the troughs to close the open top thereof each include a respective drip hood flange 52 and 54 extending longitudinally along respective side margins or edges of the top planar horizontal wall of the cover for overlapping engagement with respective reverse bends 28. The upstanding leg 20 extends completely across the top planar wall surface of the cover and merges at its lower ends with the drip hood flanges 52 and 54 below the top edge of trough walls 34 so that the trough walls are completely and imperviously overlapped between their ends. An opening 56 is also formed in each drip hood adjacent opposite ends for alignment with respective openings 58 in the trough reverse bends 28 and openings 60 in the connector reverse bends 32. The openings 56, 58 and 60 receive self tapping screws to fasten a connector cover 62 thereto.

The connector cover 62 extends longitudinally substantially the same distance as the connector 30 and includes a top wall 64 for overlapping adjacent ends of the top wall of adjacent abutting covers. Cover 62 includes drip hood flanges 66 and 68 which extend downwardly to overlappingly engage the respective cover drip hood 52 and 54 respectively. Openings 70 in flanges 66 serve to receive the screws extending through respective openings 56, 58 and 60 for securing the adjacent covers 18 to the troughs and connectors in a unitary assembly.

An upstanding embossment 72 on the top wall 64 of the cover 62 forms a covered recess 74 for receiving the upstanding legs or lips 20 on adjacent covers 18 so that the juncture of the covers and troughs of adjacent sections are completely overlapped and rendered raintight.

It will also be noted that a reverse or inwardly extending bend or leg 76 and 78 respectively is formed on the flanges 54 and 68 of the covers 18 and 62 respectively. The legs 76 and 78 are received below the reverse bends 28 and 32 of the troughs and connector to interlock the corresponding side or edge of the cover against upward movement and eliminate the need for fastening devices along the respective edges. One side of the wireway is usually mounted adjacent a wall and therefore the covers may be slid over the top of the trough and moved to engage the lips 76 and 78 beneath the reverse bends 28 and 32 of the trough and adjacent connector. This avoids the use of screws along the corresponding side since access thereto by a screwdriver may be inconvenient if mounted adjacent a wall.

The gangable raintight wireway is assembled with the tandem sections or troughs 12 and 14 secured together by means of self tapping screws through the holes 50 and 48 in the back walls 24 and 36 of the troughs and the connectors. The connectors 30 are usually secured previously to a support wall 42 of bracket 44, as mentioned. This bracket has a wall 79 which is fastened to a support wall and the holes in wall 42 are pivotal for either a 4" or 6" wide trough to space the correspondingly wider connector from an adjacent support wall by a selected or predetermined distance. The spacing to permit the legs 76 and 78 to be moved a sufficient distance past the reverse bends 28 and 32 to permit the legs to engage beneath the bends. Wall 42 is thus provided with openings spaced to receive different trough widths and in the 6" wide troughs, openings are also provided in the side legs 34 of those troughs and connectors to insert screws for fastening the side legs together. The slots 46 permit common tooling to form the slots in different width troughs. The troughs 12 and 14 may thereafter be assembled to the connectors 30 by inserting their side legs between the connector side legs and then securing the back walls together as explained.

Knockouts 80 in the back wall of the trough permit conduit and/or fittings to be secured thereto for extending wires into or from the trough. The wires are extended in the troughs and through any of the accompanying fittings that may be used such as junction box 82, elbow 84 or tee 86 and/or the panel adapter 90.

It will be noted that the fittings 82, 84 and 86 each include respective U-shaped open projecting end portions 92 extending at selected angles to each other usually 90°, for engaging a respective trough end with the troughs extending in respective different directions. The end portions 92 are each adapted to be received by a respective connector 30 which also receives a portion of the respective trough end. For purposes already explained similar to openings 46 and 50 appropriate openings 94 are formed in the bottom walls of the portions 92.

The portions 92 of each fitting are joined by appropriate intermediate bottom and side wall sections 95. Both the legs of the U shaped portions 92 and the intermediate side wall sections are provided with reverse bends such as 28 for overlapping engagement by respective covers 96, 98 and 100.

The covers include a top wall portion 102 projecting over a respective U shaped projecting portion 92 and having a respective drip hood flange 104 overlapping the reverse bend of the projecting portion 92 and in turn adapted to be overlapped and secured to a respective connector cover such as 62 as already described. Upstanding lips or flanges 106 at the end of each cover overlapping the projecting portion 92 and similar to flanges 20 are received in the recess 74 of the connector cover wall. The top wall of each fitting includes an intermediate wall portion provided with a drip hood integrally formed intermediate the drip hood flanges 104 to form an impervious top wall for each fitting with a short vertical end being formed on the free end of the each fitting drip hood flange below the lower edge of reverse bends. Thus the connector assembly 22 may be used with either a pair of adjacent troughs 12 or 14 or with a trough and one of the fittings.

Figure 9:
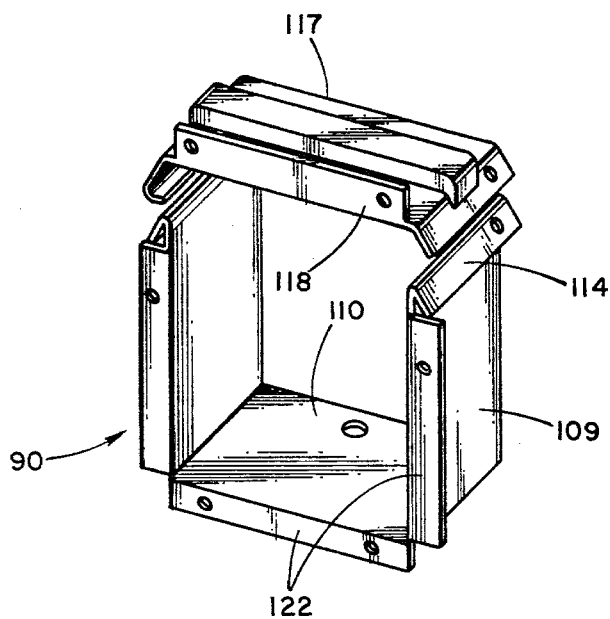
FIG. 9 is a panel adapter for use between the wireway and a cabinet or panel, for example.
Figure 10:
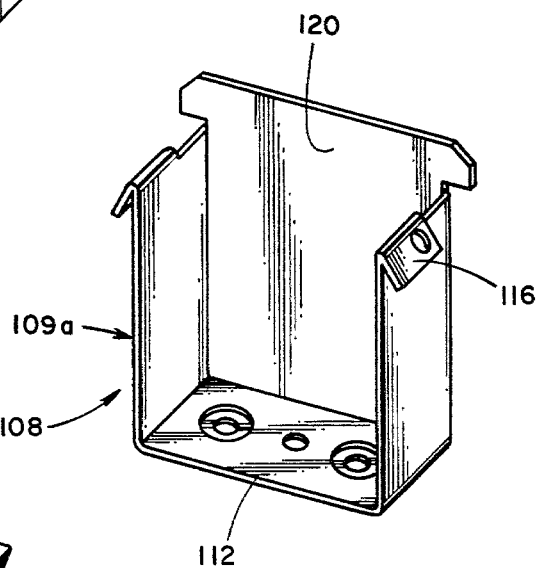
FIG. 10 is a closing plate shown for use with the wireway and connector cover in place of a connector.

The panel adapter 90 and a closing plate 108 seen in FIGS. 9 and 10 respectively are each provided with a U shaped portion 109 and 109a respectively for nestingly receiving an end portion of a respective U-shaped trough for example and each U-shaped portion 109 and 109a is provided with a back wall 110 and 112 respectively to which the engaging trough wall may be fastened. The side legs of the panel adapter 90 and the closing plate 108 each have reverse bends 114 and 116 respectively for receiving the reverse bends of the respective trough portions and over which the end portions of covers 18 may extend together with a connector cover. A connector cover is then fastened to the reverse bends 114 or 116 so that both the adapter and closing plate serve as a connector for either a trough or fitting. It will be noted a connector cover 117 similar to covers 18 is used for adapter 90 and it differs from covers 62 in that it is provided with a vertical end flange 118 for purposes to be explained.

Since the closing plate 108 may be outdoors it is provided with an end wall 120 abutting the open end of an engaging trough to close a respective trough or fitting end. An upstanding flange similar to flange 20 is formed thereon and is received beneath the connector cover and in its recess 74 to seal the closed end.

The panel adapter 90 includes outwardly extending flanges 122 on the U shaped portion and located adjacent the trough or fitting end when assembled. A gasket not shown is sandwiched between the flanges 122, the flange 118 of the cover 117 and a cabinet wall having an opening in communication with the trough or fitting end to secure the panel adapter to a cabinet into which the wires in the trough may extend with the gasket serving to seal the corresponding ambient opening.

In the event of rain or the like falling on the covers 18, 96, 98, 100 or 117, the liquid will of course roll down the drip hood flanges 52, 54, 66, 68 and 104 and since the holes therein and lower edges thereof are below the level of the upper edges or juncture between the reverse bends 28 of the troughs and their side legs 34, the liquid cannot enter the wireway sections between the overlapping flanges. Likewise the facing or abutting upstanding end flanges 20, 102, 106 and 120 extending to the drip hoods and below the top edge of the reverse bends such as 28 prevent moisture or water from entering the troughs between the ends of drip hood covers and guide the water onto the drip hood flanges where it is permitted to run off. The receipt of the upstanding flanges under the connector covers 62 or 117 and in the cover recesses 74 serves to prevent water entering between the cover junctures. Any moisture that might condense in the troughs or enter the trough is of course permitted to exit through the drain holes in the bottom of the troughs.

It will also be noted that the various embossments such as about holes 40 and 74 and flanges such as 20, 32, 52 and 78 serve to rigidify the assembly.

The foregoing is a description of an improved and more economical gangable raintight wireway assembly whose inventive concepts are believed set forth in the accompanying claims.

What we claim is:

1. A gangable raintight wireway assembly comprising:

a plurality of U-shaped troughs each having a bottom wall for end to end engagement and side walls for end to end engagement with a respective wall of the other trough, said side walls forming side legs which terminate in upper edges, a trough cover for each trough having a top wall and longitudinal edges, said top wall extending between said side legs and a drip hood flange along each longitudinal edge of said top wall extending outwardly and downwardly from said top wall to a position below the upper edge of said side walls, an end flange for each cover transverse to said drip hood flanges and extending upwardly from said top wall and outwardly beyond the edges of said top wall to a position below the upper edge of said side walls for facing a flange on an adjacent cover and for preventing the entrance of water into a respective trough between ends of said cover, a connector cover having a top wall overlappingly engaging adjacent cover end portions with said top wall having drip hood flanges each overlapping engaging end portions of adjacent drip hood flanges of adjacent covers and an upwardly extending boss in said cover top wall having a recess for receiving the upwardly extending facing flanges of adjacent covers, and means for securing said connector cover to said trough covers and said troughs.

2. The assembly claimed in claim 1 in which said means includes, reverse bends along the upper edges of the side walls of each trough for nesting engagement with the drip hood flanges of a respective trough cover, a connector having a generally U-shape for nestingly receiving adjacent end portions of the bottom wall of a pair of respective troughs in end to end engagement and having a reverse bend at the free end of each connector side leg for nestingly receiving the reverse bend at the upper end of adjacent troughs.

3. The assembly claimed in claim 2 in which a leg is provided on the outer end of one drip hood of each cover for interlocking engagement beneath one reverse bend of said connector.

4. The assembly claimed in claim 2 in which aligned apertures are provided in said cover drip hood flanges and trough and connector reverse bends below the upper edge of said trough reverse bends for receiving a fastening device.

5. In the assembly claimed in claim 2, a fitting having U shaped end portions projecting in different angular directions for abutting engagement with a respective trough with reverse bends at the upper end of the side legs of said fitting adapted to be received by the reverse bends of said connector, a fitting cover portion for each projecting portion having drip hood flanges for engagement beneath the drip hood flanges of said connector cover and an upstanding flange at one end for receipt in said connector cover recess.

6. In the assembly claimed in claim 5 an interconnecting wall portion integrally interconnecting the fitting cover portions of a respective fitting and having drip hood flanges interconnecting the respective drip hood flanges of the respective cover portions.

7. The assembly claimed in claim 6 in which said fitting forms a junction box with two pair of U shaped projecting portions with each pair extending at substantially a right angle to the other pair.

8. The assembly claimed in claim 6 in which said fitting forms an elbow for interconnecting a pair of troughs.

9. The assembly claimed in claim 6 in which said fitting forms a tee for interconnecting three troughs.

10. In the assembly claimed in claim 2, a U shaped closing plate having side walls and a bottom wall for nestingly receiving the side and bottom walls of a respective trough, and a closure wall on said closing plate for abutting engagement with the ends of said respective trough, said closure wall having a transverse upstanding flange for abutting engagement with the respective trough cover end flange and received in said connector cover boss recess.

11. In the assembly claimed in claim 2, a U shaped adapter plate for nestingly receiving a respective trough end with outwardly extending flanges on said adapter plate side and bottom walls for sandwiching a gasket between said flanges and a cabinet wall, and a connector cover having drip hood flange for overlapping engagement with the end of said trough, said last cover having a recessed boss to receive said cover and flange and an outwardly extending flange at one end of said connector cover for engaging said gasket.

12. In the assembly claimed in claim 3 a support bracket for said troughs comprising a pair of transverse walls, one of said transverse walls arranged to secure said bracket to a support wall and the other of said transverse walls having a plurality of spaced apart apertures therein for enabling the bottom walls of said troughs and connector to be secured thereto with said troughs spaced from said support wall by a selected distance.

13. The assembly claimed in claim 12 in which said apertures are spaced to enable different trough widths to be secured to said other transverse wall.

14. The assembly claimed in claim 12 in which embossments depend from the bottom wall of said connector to space said connector and trough bottom walls from said other transverse wall.

15. A gangable raintight wireway assembly comprising:
a pair of U shaped troughs each having a bottom wall and side walls connected thereto, said side walls forming side legs which terminate in upper edges, and a bend along opposite longitudinal margins of the side walls of each trough extending outwardly and downwardly from the upper edges of said side walls, each bottom wall having a pair of drain holes adjacent opposite ends of said trough,
a cover for each trough with each cover having a top surface and longitudinal edges, said cover having a drip hood flange along each longitudinal edge extending generally parallel with each reverse bend and extending downwardly and outwardly from the top surface of said cover for overlapping engaging each reverse bend of a respective trough and extending below the upper edge of each trough side leg,
an end flange for each cover extending upwardly from each cover transverse to the longitudinal axis for abutting an end flange on an adjacent cover and extending past the juncture of each drip hood flange and said top surface of each cover for preventing the entrance into said trough of water between opposite ends of said cover,
a connector having a generally U-shape for nestingly receiving adjacent end portions of a pair of respective troughs and having side legs with a reverse bend at the free end of each side leg for nestingly receiving the reverse bend of adjacent troughs;
and a connector cover having a top wall with an upwardly extending recess therein for receiving abutting end flanges of adjacent cover portions and having drip hood flanges extending outwardly and downwardly from opposite margins of said top wall for overlapping engaging the drip hood portions of adjacent covers to prevent the entrance of water into each trough through the juncture between adjacent covers.

16. In the assembly claimed in claim 15 means on each trough and on each cover for fastening each connector cover and one trough cover simultaneously to the reverse bends of said trough and connector at a position below the upper edge of the side legs of said trough.

17. The gangable wireway assembly claimed in claim 16 in which said means includes an inwardly extending leg on a respective one of said connector and cover drip hoods for engagement beneath the reverse bends of adjacent troughs and receiving connector for interlocking the adjacent cover edges.

18. A gangable duct assembly comprising:
a pair of generally U-shaped trough sections having a bottom integrally connecting a first and a second upwardly extending side portion, said side portions each including an outwardly and downwardly directed side flange extending longitudinally throughout the length of said trough section,
a pair of covers respectively covering said trough sections; said covers each including a hooked first flange overlying and coextensive with said side flange on said first side portion and having a hook portion extending inward toward said first side portion in hooking relationship to said side flange on said first side portion and a second flange overlying and coextensive with said side flange on said second side portion, said second flange including means for securing said cover to said trough,
an upwardly extending flange integrally formed at opposite ends of said cover and extending from said first flange to said second flange, adjacent covers providing a pair of said upward flanges in facing relationship to each other,
a generally U-shaped connector nestingly receiving said pair of troughs in longitudinally aligned relationship; and
a connector cover including an integral rib portion receiving said faced upward flanges of adjacent covers, said connector cover including a hooked third flange overlying said first flange and having a hook portion extending inward toward said first side portion in hooking relationship with said first flange and said side flange on said first side portion.

19. A gangable duct assembly as claimed in claim 18, wherein said connector includes outwardly and downwardly extending flanges in underlying relationship to said flanges on said first and second side portions and wherein said hooked flange of said connector cover is in hooking relationship with said flanges of said cover, said trough and said connector.

* * * * *